United States Patent
Gu

(10) Patent No.: US 9,071,176 B2
(45) Date of Patent: *Jun. 30, 2015

(54) APPARATUS AND METHOD FOR CONTROLLING MOTOR

(71) Applicant: SAMSUNG ELECTRO-MECHANICS CO., LTD., Suwon, Gyunggi-do (KR)

(72) Inventor: Bon Young Gu, Gyunggi-do (KR)

(73) Assignee: SAMSUNG ELECTRO-MECHANICS CO., LTD., Suwon-Si, Gyeonggi-Do (KR)

(*) Notice: Subject to any disclaimer, the term of this patent is extended or adjusted under 35 U.S.C. 154(b) by 166 days.

This patent is subject to a terminal disclaimer.

(21) Appl. No.: 13/846,921

(22) Filed: Mar. 18, 2013

(65) Prior Publication Data

US 2014/0152223 A1 Jun. 5, 2014

(30) Foreign Application Priority Data

Dec. 3, 2012 (KR) .......................... 10-2012-0138922

(51) Int. Cl.
*H02P 1/00* (2006.01)
*H02P 5/00* (2006.01)
*H02P 6/08* (2006.01)
*H02P 29/00* (2006.01)
*H02P 23/00* (2006.01)

(52) U.S. Cl.
CPC ............ *H02P 6/08* (2013.01); *H02P 2005/008* (2013.01); *H02P 29/0016* (2013.01); *H02P 23/0068* (2013.01)

(58) Field of Classification Search
USPC ......... 318/602, 603, 490, 599, 400.2, 400.12, 318/400.3
See application file for complete search history.

(56) References Cited

U.S. PATENT DOCUMENTS 4,086,471 A * 4/1978 Takahashi ..................... 377/47
4,283,783 A * 8/1981 Nakajima et al. ............. 368/76

(Continued)

FOREIGN PATENT DOCUMENTS

| JP | 2008-051587 A | 3/2008 |
| JP | 2008-228446 A | 9/2008 |
| JP | 2012-144248 A | 8/2012 |

OTHER PUBLICATIONS

Japanese Office Action issued in Japanese Application No. 2013-049674 issued Mar. 11, 2014, with English Translation.

(Continued)

*Primary Examiner* — Paul Ip
(74) *Attorney, Agent, or Firm* — McDermott Will & Emery LLP

(57) ABSTRACT

There is provided an apparatus and a method for controlling a motor. The apparatus for controlling a motor includes a signal detection unit detecting a first signal, a sampling unit acquiring the number of pulses of the first signal included in a predetermined sampling period, and an operation unit dividing the sampling period into a predetermined number of, a plurality of sub periods, and computing a speed of a motor by allocating predetermined weights to the number of pulses of the first signal included in the plurality of respective sub periods, wherein the operation unit computes the speed of the motor by controlling at least one of the weights and the number of sub periods when the number of pulses of the first signal included in the plurality of respective sub periods is different.

13 Claims, 2 Drawing Sheets

(56) References Cited

U.S. PATENT DOCUMENTS

| | | | |
|---|---|---|---|
| 4,599,569 A * | 7/1986 | Furuhata et al. | 327/7 |
| 4,720,753 A * | 1/1988 | Iwasaki et al. | 360/77.15 |
| 4,869,347 A * | 9/1989 | Takahashi et al. | 187/293 |
| 5,528,573 A * | 6/1996 | Shim | 369/47.45 |
| 6,019,448 A * | 2/2000 | Yano et al. | 347/12 |
| 6,333,610 B1 * | 12/2001 | Meschik et al. | 318/400.14 |
| 7,319,652 B2 * | 1/2008 | Nishimura et al. | 369/53.35 |
| 7,633,256 B2 * | 12/2009 | Reichert et al. | 318/602 |
| 8,444,567 B2 * | 5/2013 | Satoh | 600/463 |
| 2003/0151997 A1 * | 8/2003 | Nishimura et al. | 369/53.3 |
| 2005/0180273 A1 * | 8/2005 | Nishimura et al. | 369/44.14 |
| 2006/0250104 A1 * | 11/2006 | Reichert et al. | 318/651 |
| 2007/0108969 A1 * | 5/2007 | Kurimoto et al. | 324/207.25 |

OTHER PUBLICATIONS

Notice of Office Action Korean Patent Application No. 10-2012-0138922 dated Oct. 22, 2013 with English translation.

* cited by examiner

APPARATUS AND METHOD FOR CONTROLLING MOTOR

CROSS-REFERENCE TO RELATED APPLICATIONS

This application claims the priority of Korean Patent Application No. 10-2012-0138922 filed on Dec. 3, 2012, in the Korean Intellectual Property Office, the disclosure of which is incorporated herein by reference.

BACKGROUND OF THE INVENTION

1. Field of the Invention

The present invention relates to an apparatus and a method for controlling a motor, capable of accurately detecting a speed of a motor, by computing the number of pulses of a first signal included in respective sub periods by dividing a predetermined sampling period into a plurality of sub periods, in connection with a first signal having a pulse form indicating a speed of a motor, in detecting the speed of the motor, method of and when the number of pulses of the first signal included in respective sub periods is different, that is, when the speed of the motor is not constant but changed, by allocating different weights to the number of pulses included in respective sub periods or controlling the number of sub periods dividing a sampling period.

2. Description of the Related Art

When a motor is operated, an output signal of a sensor detecting a position and a speed of a rotor may be generated in pulse form. A speed of a motor, a position of a rotor, and the like, are detected by using the sensor signal generated in pulse form, such that the motor may be controlled so as to be operated at a required speed. Therefore, in order for a motor to be precisely controlled at a required state, the speed, the position, and the like, of the motor, need to be accurately detected.

When the number of pulses included in the sensor signal at the time of rotating the rotor once is defined as pulses per rotation (PPR), revolutions per minute (RPM) of the motor may be defined as follows.

$$\text{Revolutions per minute of motor } \frac{60}{Tc} \frac{n}{PPR} \quad \text{Equation 1}$$

In Equation 1, Tc represents a sampling period detecting the number of pulses included in the sensor signal and n represents the number of pulses included in one sampling period.

When the number of pulses included in a predetermined sampling period is detected, the sampling period and the pulse are not synchronized with each other, such that an error may occur in terms of the number of pulses. In particular, in the above Equation 1, when n=1, a relatively larger error may occur in detection of RPM of the motor and the error in the RPM of the motor may be reduced by increasing the PPR, simply by increasing Tc. However, when Tc is increased, the sampling period detecting the number of pulses may be relatively long, affecting the computation of the speed of the motor from the detection time of the speed of the motor to the previously generated pulse. Therefore, there is a problem in that Tc may not increase infinitely in order to reduce the error in the detection of RPM of the motor.

The related art document below relates to a sensor module and discloses that a sensor module detects the speed of a motor by changing a sampling period. However, the related art document below only discloses detecting the speed of a motor based on a variable sampling period and does not disclose accurately detecting the speed of a motor without significantly increasing the sampling period by dividing one sampling period into a plurality of sub periods while leaving the entire sampling period the same.

[Related Art Document]

Japanese Patent Laid-Open Publication No. JP 2008-051587

SUMMARY OF THE INVENTION

An aspect of the present invention is to provide an apparatus and a method for controlling a motor, capable of precisely controlling the motor, by computing the number of pulses of a first signal included in a predetermined sampling period, in connection with a first signal having a pulse form reflecting a speed of a motor, method of dividing a sampling period into a plurality of sub periods, allocating weights to the number of pulses included in each sub period, and computing the speed of the motor, based on the allocated weights, to reduce an error between an actual speed and a detected speed at the time of detecting the speed of the motor without significantly increasing the sampling period.

According to an aspect of the present invention, there is provided an apparatus for controlling a motor, including: a signal detection unit detecting a first signal; a sampling unit acquiring the number of pulses of the first signal included in a predetermined sampling period; and an operation unit dividing the sampling period into a predetermined number of, a plurality of sub periods, and computing a speed of a motor by allocating predetermined weights to the number of pulses of the first signal included in the plurality of respective sub periods, wherein the operation unit computes the speed of the motor by controlling at least one of the weights and the number of sub periods when the number of pulses of the first signal included in the plurality of respective sub periods is different.

The operation unit may compute the speed of the motor by allocating different weights to the number of pulses of the first signal included in the plurality of respective sub periods.

The operation unit may allocate higher weights to the number of pulses of the first signal included in a sub period close to an end of the sampling period among the plurality of sub periods.

The operation unit may allocate higher weights to the plurality of respective sub periods in the case that the respective sub periods include a larger number of pulses of the first signal when the number of pulses of the first signal included in the plurality of respective sub periods is different.

The operation unit may divide the sampling period into a larger number of sub periods than the number of the sub periods in the case that the number of pulses of the first signal included in the plurality of respective sub periods is different.

The operation unit may compute the speed of the motor for the entire sampling period.

According to another aspect of the present invention, there is provided a method of controlling a motor, including: detecting a first signal; acquiring the number of pulses of the first signal included in a predetermined sampling period; dividing one sampling period into a predetermined number of, a plurality of sub periods; and computing a speed of a motor by allocating predetermined weights to the number of pulses of the first signal included in the plurality of respective sub periods.

In the computation of the speed of the motor, the speed of the motor may be computed by controlling at least one of the weights and the number of sub periods when the number of pulses of the first signal included in the respective sub periods is different.

In the computation of the speed of the motor, the speed of the motor may be computed by allocating different weights to the number of pulses of the first signal included in the plurality of respective sub periods.

In the computation of the speed of the motor, higher weights may be allocated to the number of pulses of the first signal included in a sub period close to an end of the sampling period among the plurality of sub periods.

In the computation of the speed of the motor, higher weights may be allocated to the sub periods including a larger number of pulses of the first signal when the number of pulses of the first signal included in the plurality of respective sub periods is different.

In the computation of the speed of the motor, the sampling period may be divided into a larger number of sub periods as the difference in the number of pulses of the first signal included in the plurality of respective sub periods is increased.

The speed of the motor may be the speed of the motor for the entire sampling period.

The number of plurality of sub periods may be $2^n$ (n is an integer of 1 or more) and the weights allocated to the plurality of respective sub periods may have a value of $2^m$ (m is an integer of 0 or more).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
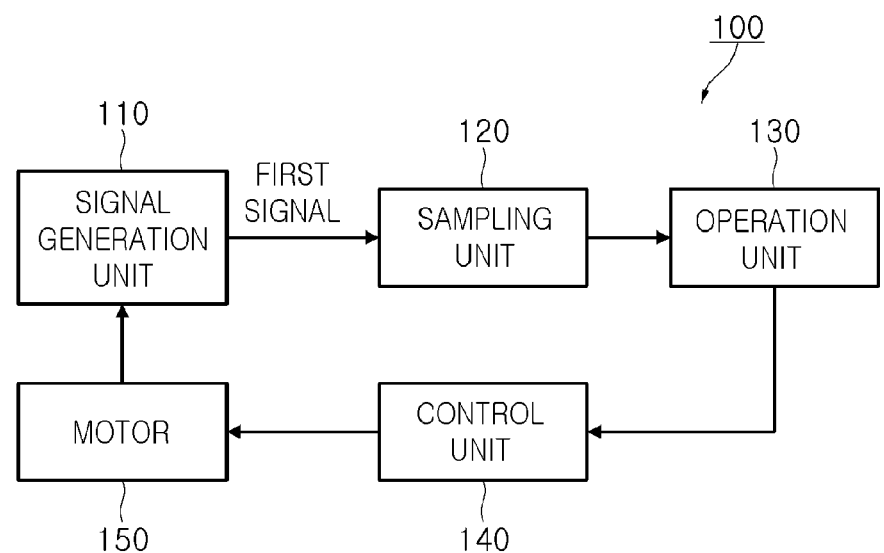
FIG. 1 is a block diagram schematically illustrating an apparatus for controlling a motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a block diagram schematically illustrating an apparatus for controlling a motor according to an embodiment of the present invention.

Referring to FIG. 1, an apparatus 100 for controlling a motor according to an embodiment of the present invention may include a signal generation unit 110, a sampling unit 120, an operation unit 130, and a control unit 140. The control unit 140 controls an operation of a motor 150 and the signal generation unit 110 may use a signal output from the motor 150 to generate a first signal indicating a position, a speed, and the like of a rotor of a motor.

The first signal output by the signal generation unit 110, which is a signal determined by the speed, the position, and the like, of the rotor, may be a signal of a form including a plurality of pulses. For example, as the rotor rotates relatively fast, the first signal may include a larger number of pulses, such that the speed of the rotor of the motor may be measured by counting the number of pulses detected in the first signal within a specific time.

In order to accurately detect the speed of the rotor, the time of detecting the number of pulses of the first signal may be significantly increased. For example, the speed of the rotor may be more accurately detected by counting the number of pulses appearing in the first signal for 30 μs than by counting the number of pulses appearing in the first signal for 10 μs. However, the method may be applied only to the case in which the speed of the rotor is constantly maintained without being significantly changed. When the speed of the rotor is significantly changed, it may be difficult to detect the accurate speed of the motor even in the case in which the time of detecting the number of pulses of the first signal is increased.

When the speed of the rotor is significantly changed, the number of pulses of the first signal is significantly increased or reduced. That is, when the speed of the rotor is increased, the first signal includes a larger number of pulses within the same time, and when the speed of the rotor is reduced, the first signal includes a smaller number of pulses within the same time.

It is assumed that after the rotor rotates relatively fast and then the speed of the motor is suddenly reduced, the speed of the motor is actually relatively slow at the specific time when the apparatus 100 for controlling a motor detects the speed of the rotor. In this case, in order to accurately measure the speed of the rotor, when the detection time of the number of pulses of the first signal is set long, a larger number of pulses may be provided than those in the current speed within the detection time due to the inclusion of the past pulse in which the rotor rotates fast, within the corresponding detection time. Therefore, the apparatus 100 for controlling a motor may not accurately control the operation of the motor, that is, detect a faster speed of the rotor than the current actual speed at which the rotor of the motor is actually operated.

In order to solve the defect, in the present embodiment, the entire sampling period is divided into at least two sub periods, in the sampling operation of detecting the number of pulses included in the first signal generated by the signal generation unit 110. The number of pulses of the first signal included in each of at least two sub periods is separately counted and the speed of the motor 150 is measured by the computation based on the number of pulses detected in each sub period, thereby reducing the error occurring at the time of measuring the speed of the motor. Further, the measurement accuracy of the speed of the motor may be increased without increasing the entire sampling period.

Therefore, the sampling unit 120 receives the first signal to detect the number of pulses appearing in the first signal for the predetermined sampling period Tc but computes the number of pulses of the first signal included in respective sub periods $T_{S1}$ to $T_{SN}$ by re-dividing the sampling period Tc into the plurality of sub periods $T_{S1}$ to $T_{SN}$. The operation unit 130 computes the speed of the motor 150 by using the number of pulses of the first signal included in respective sub periods $T_{S1}$ to $T_{SN}$ and may simply compute the speed of the motor 150 from an average or a weighted average of the number of pulses included in respective sub periods $T_{S1}$ to $T_{SN}$. This will be described below with reference to FIG. 2.

The control unit 140 controls the operation of the motor 150 by using the speed of the motor 150 computed by the operation unit 130. Even in a case in which the speed of the motor 150 measured by the operation unit 130 includes a slight error, the speed of the motor 150 is assumed to be a speed at a specific time rather than a specific time period, and the control unit 140 may control the speed of the motor 150, and the like, from results computed by the operation unit 130. In this case, overshoot, and the like, may occur, or noise, vibrations, and the like may be adversely affected, due to a relatively large difference between the result computed by the operation unit 130 and the actual speed of the motor 150. Therefore, the speed of the motor 150 may be measured by using the number of pulses of the first signal detected in the plurality of sub periods as described above for the operation unit 130 to compute the speed of the motor 150 with the relatively smaller possible error.

Figure 2:
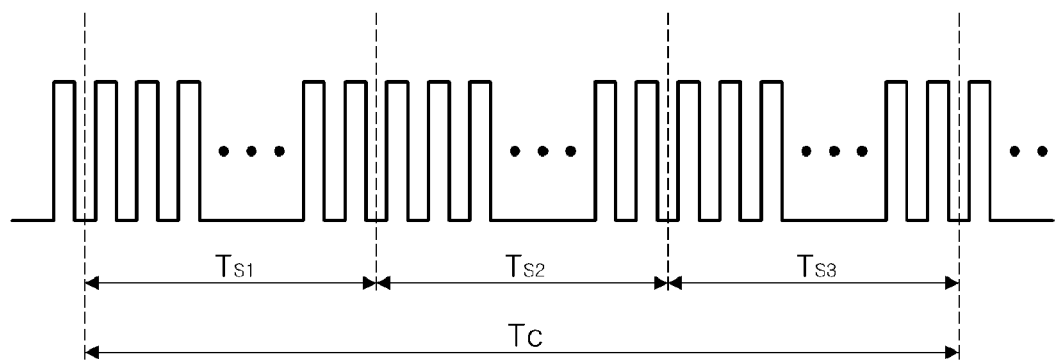
FIG. 2 is a graph for describing an operation of the apparatus for controlling a motor according to an embodiment of the present invention.

FIG. 2 is a graph for describing an operation of the apparatus for controlling a motor according to an embodiment of the present invention.

Referring to FIG. 2, the first signal is a signal having a pulse form in which the plurality of pulses repeatedly appear.

When the first signal is generated by the signal generation unit 110 as illustrated in FIG. 2, the sampling unit 120 counts the number of pulses appearing in the first signal for the sampling period Tc. The operation unit 130 may use the number of pulses detected in the sampling period Tc to compute the speed of the motor 150. The method may simply detect the speed of the motor 150 but may include lots of errors.

The sampling unit 120 counts the number of pulses appearing in the first signal for the sampling period Tc and the speed of the motor 150 computed by the operation unit 130 is applied as the speed of the motor 150 at the end of the sampling period Tc rather than the speed of the motor for the sampling period Tc. Further, in order for the operation unit 130 to accurately detect the speed of the motor 150, a relatively long sampling period Tc is required.

However, when the sampling period Tc is set to be excessively long, the pulse of the first signal generated long before the end of the sampling period Tc at which the speed of the motor 150 is detected also affects the computation of the speed of the motor 150. Therefore, the present embodiment proposes a method of computing the speed of the motor 150 by dividing the sampling period Tc into a plurality of sub periods $T_{S1}$, $T_{S2}$, and $T_{S3}$ rather than simply setting the sampling period Tc to be long. Further, dividing the sampling period Tc into three sub periods is by way of example only, and therefore the sampling period Tc may be divided into sub periods smaller or larger than three.

Hereinafter, for the convenience of explanation, it is assumed that the number of pulses is included in individual sub periods $T_{S1}$, $T_{S2}$, and $T_{S3}$ among the plurality of sub periods as in the following Table 1, in connection with first to third cases.

TABLE 1

| Case | Sampling Section | The number of Pulses | Total Number of Pulses |
|---|---|---|---|
| First Case | $T_{S1}$ | 40 | 120 |
|  | $T_{S2}$ | 40 |  |
|  | $T_{S3}$ | 40 |  |

TABLE 1-continued

| Case | Sampling Section | The number of Pulses | Total Number of Pulses |
|---|---|---|---|
| Second Case | $T_{S1}$ | 30 | 120 |
|  | $T_{S2}$ | 30 |  |
|  | $T_{S3}$ | 60 |  |
| Third Case | $T_{S1}$ | 60 | 120 |
|  | $T_{S2}$ | 40 |  |
|  | $T_{S3}$ | 20 |  |

Referring to Table 1, in the first case, the same number of pulses is detected in respective sub periods $T_{S1}$, $T_{S2}$, and $T_{S3}$, and in the second and third cases, different numbers of pulses are detected in respective sub periods $T_{S1}$, $T_{S2}$, and $T_{S3}$. That is, it is assumed that the first case corresponds to the case in which the speed of the motor 150 is almost constant without being significantly changed, the second case corresponds to the case in which the speed of the motor 150 is increased, and the third case corresponds to the case in which the speed of the motor 150 is reduced.

The operation unit 130 may compute the speed of the motor 150 by a weighted average method of allocating predetermined weights to the number of pulses calculated in respective sub periods $T_{S1}$, $T_{S2}$, and $T_{S3}$, and $T_{S3}$ and computing an average thereof. In this case, the speed of the motor 150 computed by the operation unit 130 is an instantaneous speed at the end of Tc rather than the average speed for the entire sampling period Tc, such that a relatively large weight may be allocated to the number of pulses of the final sub period $T_{S3}$ that is close to the end of Tc in order to significantly reduce the errors. In the first case, in the case that the weights of 1, 2, and 6 are sequentially allocated to respective sub periods, the speed of the motor 150 is computed as follows.

$$\text{Speed of motor} = \frac{40*1 + 40*2 + 40*6}{1+2+6} = 40 \quad \text{Equation 2}$$

Meanwhile, the speed of the motor 150 is also computed as 40 in the first case, even in a case in which the general arithmetic average is computed without allocating the weights to each sub period. That is, when the speed of the motor 150 is substantially maintained constantly without being significantly changed, the operation unit 130 computes the same speed independent of the allocation of weights. On the other hand, in the second case, when the weights of 1, 2, and 6 are allocated to respective sub periods, the speed of the motor 150 is as follows.

$$\text{Speed of motor} = \frac{30*1 + 30*2 + 60*6}{1+2+6} = 50 \quad \text{Equation 3}$$

When the weights are applied, the speed of the motor 150 is computed as 50, while when the speed of the motor 150 is computed by only the arithmetic average without the weights, the speed of the motor 150 is computed as 40. The speed of the motor may constantly increase at the end of the sampling period Tc at which the speed of the motor 150 is detected, such that the speed of the motor 150 may be computed with a relatively smaller error when the weights are applied.

The third case is also similar to the second case. When the weights are applied, the speed of the motor 150 is computed as about 28.9, while when the speed of the motor is computed by the arithmetic average without the weights, the speed of the motor 150 becomes 40. Therefore, when only the arithmetic average is applied, the speed of the motor 150 that is slow while entering the third sub period $T_{S3}$ is not reflected, and more accurate computation results may be obtained when the weighted average method is applied.

Figure 3:
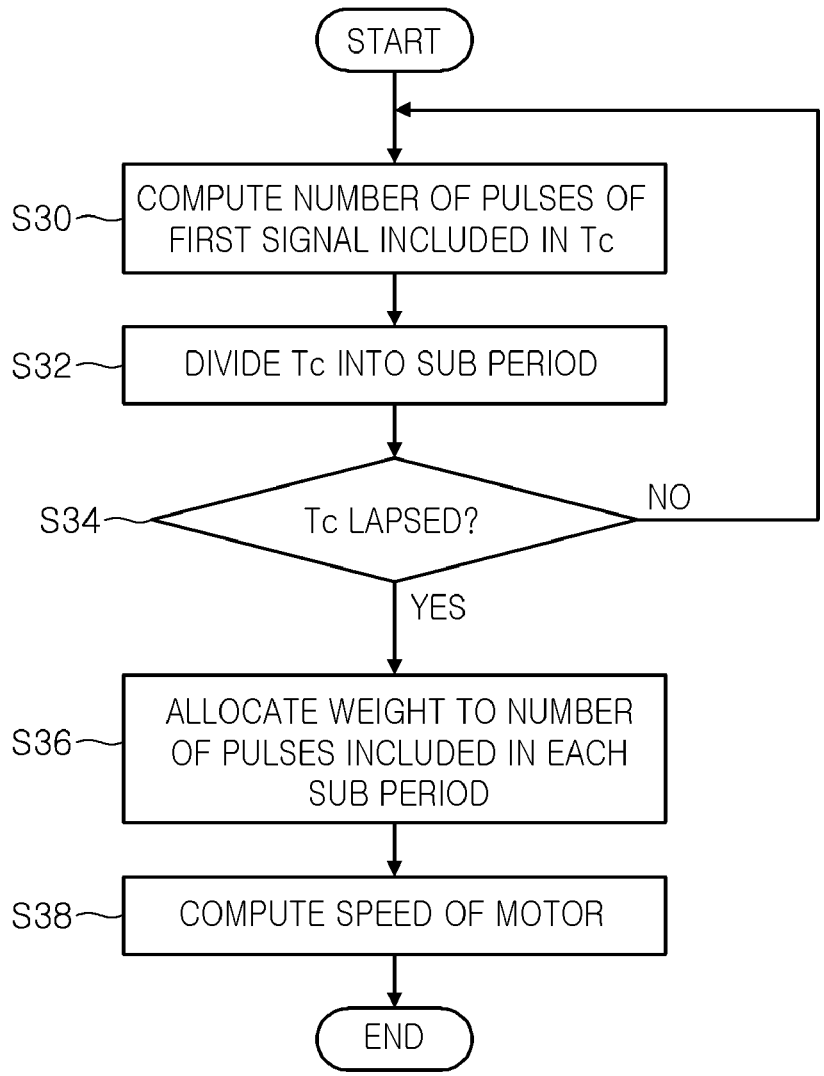
FIG. 3 is a flow chart for describing a method of controlling a motor according to another embodiment of the present invention.

FIG. 3 is a flow chart for describing a method of controlling a motor according to another embodiment of the present invention.

Referring to FIG. 3, the method of controlling a motor according to the embodiment of the present invention starts as computing the number of pulses of the first signal included in the sampling period Tc (S30). The sampling unit 120 receives the first signal output by the signal generation unit 110 and counts the number of pulses appearing in the first signal for the predetermined sampling period Tc.

The operation unit 130 receives the sampling results, divides the sampling period Tc into the plurality of sub periods (S32), and determines whether the entire sampling period Tc lapses (S33). When the entire sampling period Tc lapses, the weights are applied to the number of pulses of the first signals included in respective sub periods (S36). In this case, as described above, the speed of the motor 150 to be computed by the operation unit 130 is the instantaneous speed at the end of the entire sampling period Tc, such that relatively highest weights may be allocated to the number of pulses included in the sub period closest to the entire sampling period Tc.

Meanwhile, in S32, when the sampling period Tc is divided into the plurality of sub periods, the number of sub periods may be set to be $2^n$ (n is a natural number) in consideration of the computational amount of the operation unit 130. In this case, the operation unit 130 may be substituted by a shift operation for a division operation and for the same reason, the weights allocated to the number of pulses included in respective sub periods may also be set to a value of $2^m$ (m is an integer of 0 or more).

As described above, the operation unit 130 computes the speed of the motor 150 using the weighted average method (S38) and the control unit 140 controls the operation of the motor 150 based on the computed speed. The speed of the motor 150 may be accurately computed without setting the entire sampling period Tc to be excessively long, by applying the method proposed by the embodiment of the present invention, such that the operation of the motor 150 may be precisely controlled.

As set forth above, according to the embodiment of the present invention, the first signal reflecting the speed of the motor may be detected and the number of pulses of the first signals detected for the sampling period having the plurality of sub periods is counted. In this case, the number of pulses of the first signal included in the plurality of respective sub periods may be separately counted and the speed of the motor may be computed by separately allocating the weights to respective sub periods according to the number of pulses included in respective sub periods to precisely detect the speed of the motor without significantly increasing the sampling speed.

While the present invention has been shown and described in connection with the embodiments, it will be apparent to those skilled in the art that modifications and variations can be made without departing from the spirit and scope of the invention as defined by the appended claims.

What is claimed is:

1. An apparatus for controlling a motor, comprising:
a signal detection unit detecting a first signal;
a sampling unit acquiring the number of pulses of the first signal included in a predetermined sampling period; and
an operation unit dividing the sampling period into a predetermined number of, a plurality of sub periods, and computing a speed of a motor by allocating predetermined weights to the number of pulses of the first signal included in the plurality of respective sub periods,
wherein the operation unit computes the speed of the motor by controlling at least one of the weights and the number of sub periods when the number of pulses of the first signal included in the plurality of respective sub periods is different.

2. The apparatus of claim 1, wherein the operation unit computes the speed of the motor by allocating different weights to the number of pulses of the first signal included in the respective sub periods.

3. The apparatus of claim 2, wherein the operation unit allocates higher weights to the number of pulses of the first signal included in a sub period close to an end of the sampling period among the plurality of sub periods.

4. The apparatus of claim 3, wherein the operation unit allocates higher weights to the plurality of respective sub periods in the case that the respective sub periods include a larger number of pulses of the first signal when the number of pulses of the first signal included in the plurality of respective sub periods is different.

5. The apparatus of claim 1, wherein the operation unit divides the sampling period into a larger number of sub periods than the number of the sub periods in the case that the number of pulses of the first signal included in the plurality of respective sub periods is different from each other.

6. The apparatus of claim 1, wherein the operation unit computes the speed of the motor for the entire sampling period.

7. A method of controlling a motor, comprising:
detecting a first signal;
acquiring the number of pulses of the first signal included in a predetermined sampling period;
dividing one sampling period into a predetermined number of, a plurality of sub periods; and
computing a speed of a motor by allocating predetermined weights to the number of pulses of the first signal included in the plurality of respective sub periods,
wherein in the computation of the speed of the motor, the speed of the motor is determined by controlling at least one of the weights and the number of sub periods when the numbers of pulses of first signals included in respective sub periods are different from each other.

8. The method of claim 7, wherein in the computation of the speed of the motor, the speed of the motor is computed by allocating different weights to the number of pulses of the first signal included in the plurality of respective sub periods.

9. The method of claim 8, wherein in the computation of the speed of the motor, higher weights are allocated to the number of pulses of the first signal included in a sub period close to an end of the sampling period among the plurality of sub periods.

10. The method of claim 8, wherein in the computation of the speed of the motor, higher weights are allocated to the sub periods including a larger number of pulses of the first signal when the number of pulses of the first signal included in the plurality of respective sub periods is different.

11. The method of claim 7, wherein in the computation of the speed of the motor, the sampling period is divided into a larger number of sub periods as the difference in the number of pulses of the first signal included in the plurality of respective sub periods is increased.

12. The method of claim 7, wherein the speed of the motor is the speed of the motor for the entire sampling period.

13. The method of claim 7, wherein the number of plurality of sub periods is $2^n$ (n is an integer of 1 or more) and the weights allocated to the plurality of respective sub periods have a value of $2^m$ (m is an integer of 0 or more).

\* \* \* \* \*